United States Patent [19]
Flaherty et al.

[11] Patent Number: 5,421,230
[45] Date of Patent: Jun. 6, 1995

[54] METHOD AND APPARATUS FOR REMOVING MOTOR VEHICLE WINDSHIELDS

[75] Inventors: John S. Flaherty, Boynton Beach; Donald P. Springer, Jupiter, both of Fla.

[73] Assignee: Eliminator Industries, Riviera Beach, Fla.

[21] Appl. No.: 16,601

[22] Filed: Feb. 11, 1993

[51] Int. Cl.⁶ ............................................. B26B 7/00
[52] U.S. Cl. ............................................. 83/13; 30/371; 30/392; 29/426.4
[58] Field of Search ................. 30/392, 393, 394, 371; 220/581, 582; 83/835; 405/185; 29/426.4

[56] References Cited
U.S. PATENT DOCUMENTS

| | | | |
|---|---|---|---|
| 295,967 | 4/1884 | Abbott | 83/83.5 |
| 298,886 | 5/1884 | Peak | 83/835 |
| 4,395,850 | 8/1983 | Brown | 51/427 |
| 4,810,134 | 3/1989 | Faulconer et al. | 405/185 |
| 4,812,083 | 3/1989 | Mosier | 405/185 |
| 4,864,727 | 9/1989 | Chu | 30/392 |
| 5,007,548 | 4/1991 | Corley | 220/581 |
| 5,025,562 | 6/1991 | Palm | 30/392 |

*Primary Examiner*—Richard K. Seidel

[57] ABSTRACT

Method and apparatus for removing windshields, particularly laminated windshields, from motor vehicles during emergency rescue operations comprise an apparatus with a blade, a blade driver for reciprocating the blade, and a portable power source for the blade driver. The blade driver is selectively operated to reciprocate the blade, which breaks and pulverizes the glass and breaks the plastic lamination of the windshield along a predetermined path to circumscribe a portion of the windshield that is to be removed.

3 Claims, 3 Drawing Sheets

METHOD AND APPARATUS FOR REMOVING MOTOR VEHICLE WINDSHIELDS

BACKGROUND OF THE INVENTION

1. Field of the Invention

This invention relates generally to emergency rescue equipment, and more particularly to equipment for extricating accident victims from motor vehicles.

2. Description of the Relevant Art

A motor vehicle accident site presents a situation where speed and caution are of the utmost concern. Spinal injuries are a threat to many victims. Accident victims are frequently trapped within the vehicle due to damage or obstructions to the doors of the vehicle. In such instances, it is the duty of emergency medical technicians and firefighters to quickly and safely remove the victim from the vehicle for immediate transport to the hospital. Heavy hydraulic implements and an array of specialized tools are utilized to meet any of a number of particular problems which can arise at the accident site.

The windshield of a damaged motor vehicle must be removed in most extrications. The opening created by the removal of the windshield sometimes provides the best available access to the interior of the vehicle for treating and removing the victim, and also permits the insertion of tools necessary to pry away parts of the vehicle to extricate the victim.

The removal of motor vehicle windshields at the accident site creates hazards because of the constant danger of cuts and punctures. Safety lamination constructions substantially reduce the danger of long shards of glass, but many broken edges are always present in a broken windshield and create a danger for the victim and the specialists trying to extricate the victim. The difficulty of removing the windshield is increased because the safety-lamination of plastic within the glass is designed to adhere to the glass. The pieces of the windshield cannot merely be broken away, but this plastic lamination must also be cut. The combination of brittle glass, flexible plastic lamination, and sharp edges present a very significant obstacle to the safe and efficient removal of the windshield.

The currently-accepted technique for removing the windshield of a motor vehicle at an accident site is recommended by the International Association of Fire Chiefs and the Transportation Emergency Rescue Committee standards. According to this technique, a hand ax is used to chop the windshield so as to simultaneously break the glass and cut the plastic lamination of the windshield. The ax is used to either cut out the entire windshield, or some portion of the windshield.

The ax presents a very dangerous, labor intensive and inefficient way to remove a windshield. The hand ax technique usually requires several minutes to cut the entire windshield, which threatens the life of a severely injured victim. Extensive use of the ax itself creates a hazard due to the hectic nature of the accident site and the urgency under which the windshield must be removed. Such dangers are further magnified by difficult conditions at the site, such as rain, snow, or darkness. The head of the victim frequently rests against the windshield, and use of the ax near the victim is dangerous due to the proximity of the ax to the victim. Also, the jarring motion of the ax can aggravate spinal injuries and other injuries where movement of the patient must be carefully controlled. The process is dangerous and tedious, yet must be accomplished in the shortest time possible. The hand-ax technique is tiring and demanding of the time and energy of a rescuer, where the maximum efforts of all should be directed at the task of removing and assisting the victim.

Various power tools have been proposed to remove windshields from motor vehicles during emergency rescue operations, including rotating wheel saws. No prior tool has produced satisfactory results, particularly on broken windshields, where the hard, irregular surface and tough lamination produces significant obstacles to efficient remove. Also, sparking and shock from electrical implements can be a significant concern whenever gasoline fumes or wet conditions are present.

SUMMARY OF THE INVENTION

It is an object of the invention to provide a method and apparatus for removing windshields from motor vehicles in emergency rescue operations.

It is another object of the invention to provide a method and apparatus for removing windshields from motor vehicles in emergency rescue operations which will reduce the time necessary to remove the windshield from the motor vehicle.

It is yet another object of the invention to provide a method and apparatus for removing windshields from motor vehicles during emergency rescue operations which will improve safety for the accident victim and for the rescuer.

It is yet another object of the invention to provide a method and apparatus for removing windshields from a motor vehicles during emergency rescue operations which will be portable so as to permit use at virtually any accident site.

These and other objects are accomplished by a method and apparatus for removing windshields during emergency rescue operations which include a blade, blade driver, and a portable power source for the blade driver. The blade driver is preferably pneumatic, and the portable power source is preferably a tank of compressed gas, most preferably air. A switch is provided to selectively activate the blade driver. A flexible hose can connect the tank to the blade driver, and a pressure regulator can be provided to reduce the pressure of the compressed gas in the tank to a suitable operating pressure for the blade driver.

The blade is preferably elongated and reciprocates substantially longitudinally. The blade comprises an attachment portion for engaging the blade to the blade driver, and a portion for breaking a path through the windshield. The blade has teeth at least along one side edge, which preferably do not extend beyond the side edge. There are preferably at least two teeth aligned in substantially opposite longitudinal directions along the side edge of the blade. The blade can have a pointed glass-piercing end, preferably on the side edge bearing the teeth. The blade preferably tapers at the end to the side edge bearing the teeth, to form a wedge surface which helps to drive the blade forward. It is preferable that the breaking portion of the blade be less than about one inch in length so as to permit the blade to fully penetrate the windshield, but not to create an undue risk of injury for the victim or for the operator.

According to the method of the invention, apparatus comprising a blade, blade driver, and portable power source is brought to the accident site. The portable power source can be set adjacent to the vehicle, connected by the flexible connection to the blade driver. A switch is operated to activate the blade driver and reciprocate the blade. The reciprocating action of the blade causes the pointed end of the blade to pierce the windshield and the plastic lamination. The teeth of the blade will pulverize the glass and break the plastic lamination to permit the blade to move through the windshield. The wedge surface of the blade, if present, will assist forward movement of the blade through the windshield. The windshield, or a portion thereof, is circumscribed such that it can be quickly removed from the motor vehicle.

BRIEF DESCRIPTION OF THE DRAWINGS

There are shown in the drawings embodiments which are presently preferred it being understood, however, that the invention is not limited to the precise arrangements or instrumentalities shown, wherein.

DETAILED DESCRIPTION OF THE PREFERRED EMBODIMENTS

Figure 1:
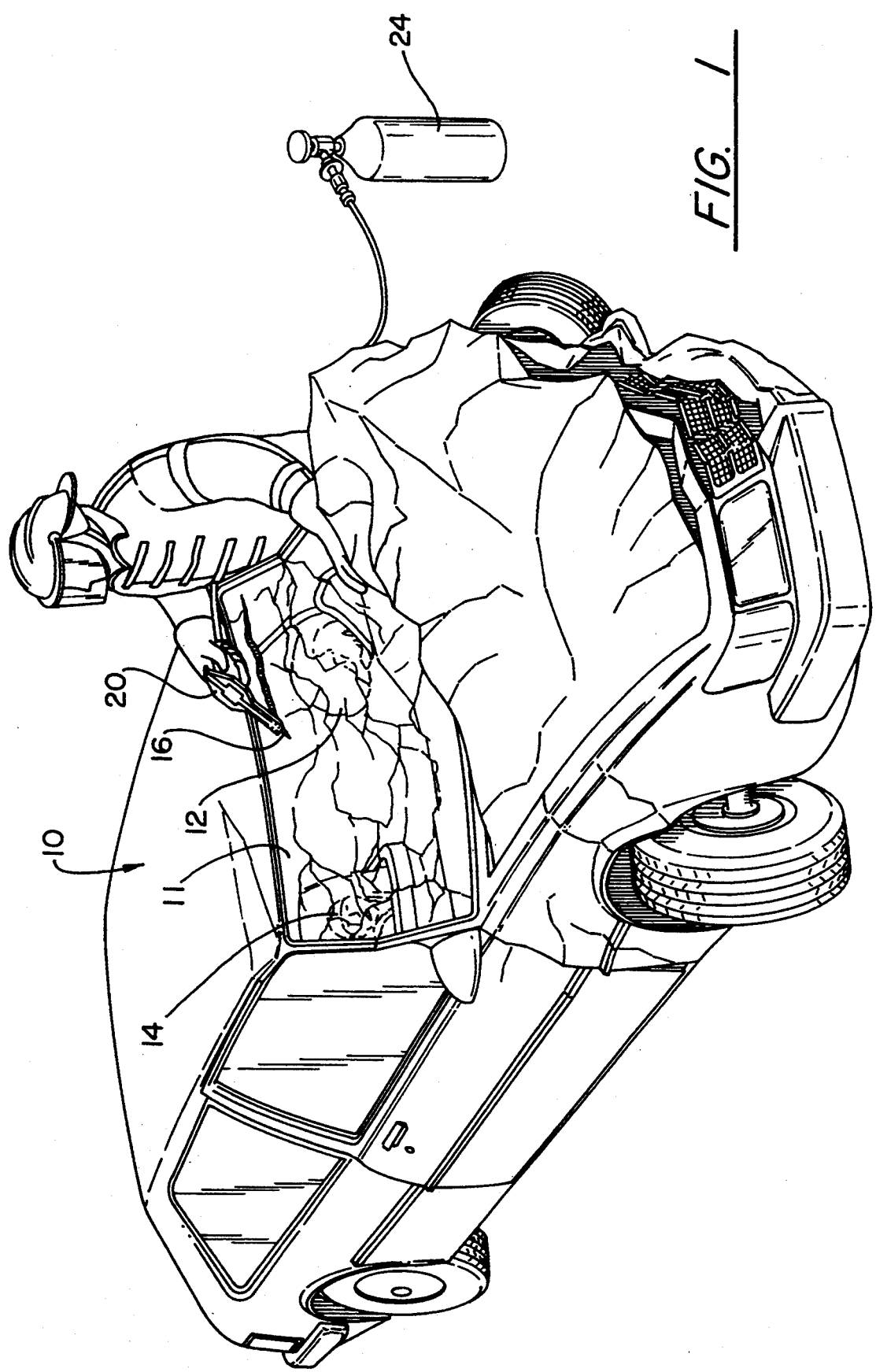
FIG. 1 is a perspective view illustrating use of the method and apparatus of the invention at an accident site.
Figure 2:
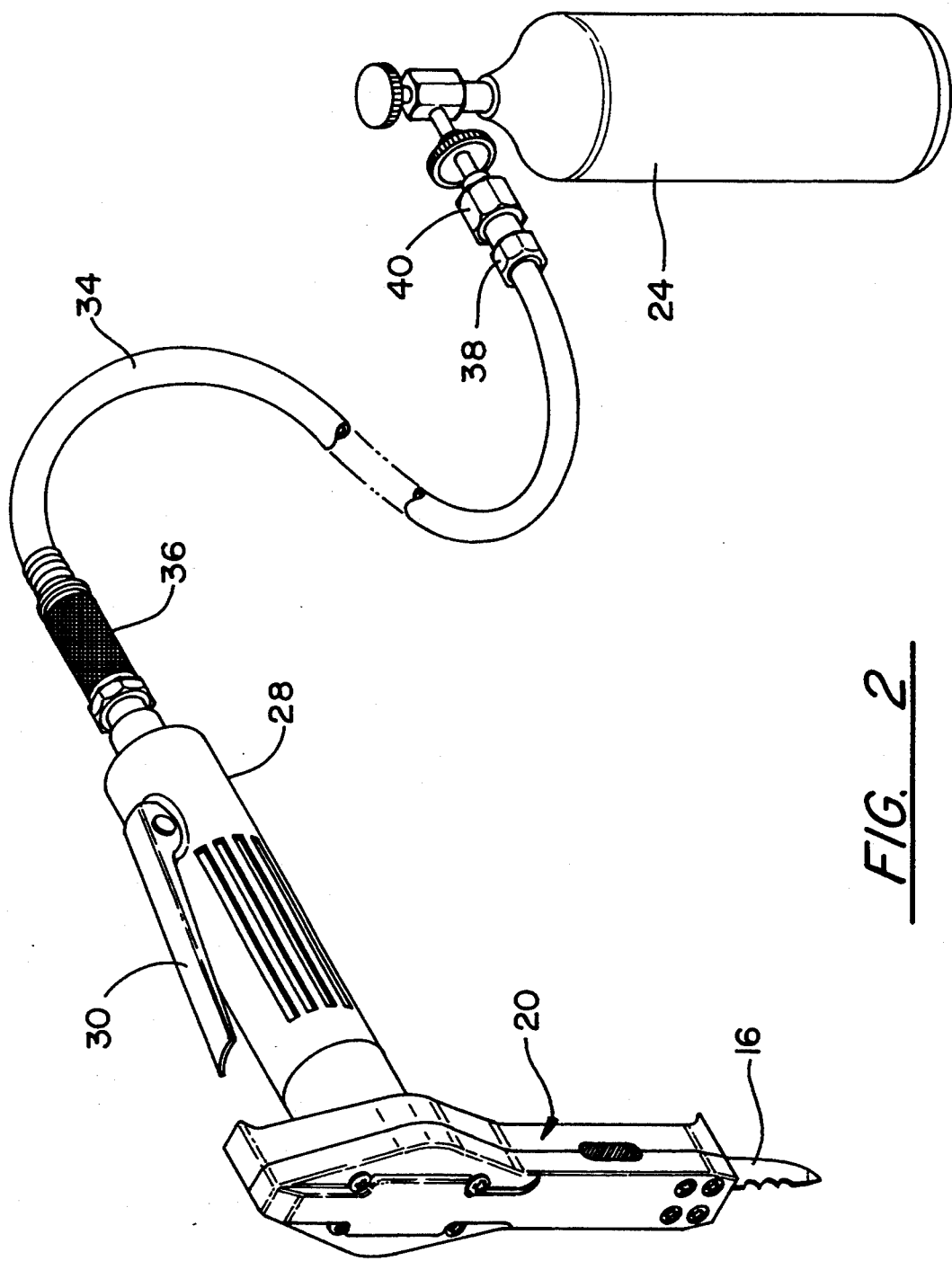
FIG. 2 is a perspective view of apparatus according to the invention, partially broken to indicate indefinite length.

A typical accident site is depicted in FIG. 1. An automobile 10 has been damaged in an accident, and the driver 12 is injured and trapped within the vehicle, with his head against the windshield 11. An infant 14 is restrained in a child seat. It is necessary to quickly remove the windshield to administer emergency health care to the victims and to remove the victims for transport to a hospital. According to the invention, apparatus more clearly shown in FIG. 2 is utilized to break and pulverize the windshield along a selected path and remove the injured occupants. A blade 16 and blade driver 20 are provided with a portable power source 24 which together act to reciprocate the blade 16. The blade driver 20 is preferably pneumatic, and the portable power source 24 is preferably a tank of compressed gas.

The pneumatic blade driver 20 is constructed according to known pneumatic principals so as to reciprocate the blade 16. Numerous pneumatic constructions are possible. The presently preferred pneumatic driver is manufactured by Equalizer Industries, Inc. of Round Rock, Texas. The construction of this device is shown in the parts chart for the product, which is fully incorporated by reference. The blade driver preferably includes a handle 28 and a switch 30 for selectively operating the driver (FIG. 2). A flexible hose 34 can be utilized to transport gas to the driver 20 from the tank 24. Fittings 36, 38 can be provided to connect the hose to the driver 20 and the tank 24. The fittings 36, 38 can be selected from numerous constructions, but preferably are of a type designed for quick connection and disconnection. A pressure regulator 40 can be provided to reduce the pressure of gas leaving the tank 24 to the desired operating pressure of the blade driver 20. In a presently preferred embodiment, pressure in the tank 24 is at least 2,000 psi, and the operating pressure of the blade driver 20 is approximately 100 psi. Substantial variation in these pressures is possible.

Figures 3, 4, 5:
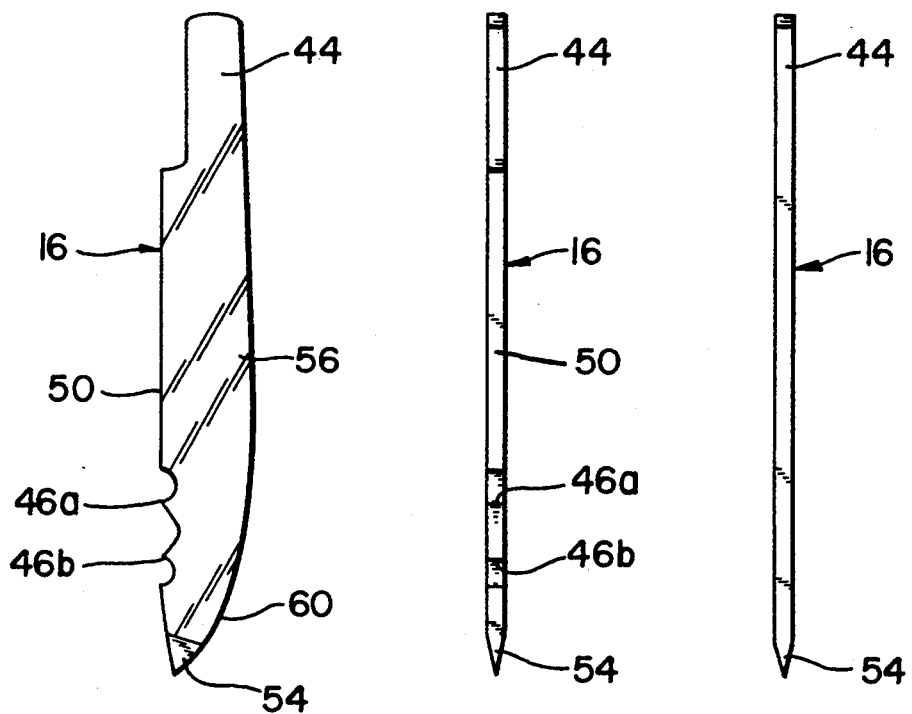
FIG. 3 is a side view of a blade according to the invention.
FIG. 4 is a front view.
FIG. 5 is a rear view.

The blade 16 preferably has a construction illustrated in FIGS. 3-5. The blade 16 can have a shank 44 that is dimensioned and shaped to connect to the particular blade driver 20 that is being utilized. Teeth 46 or other protrusions are preferably provided for pulverizing the glass and breaking the plastic lamination. The blade 16 is preferably elongated and reciprocates substantially longitudinally. Teeth 46 are preferably provided angled in either direction along the length of the blade 16. Thus teeth 46a are slanted toward the driver 20 and teeth 46b are slanted downward toward the distal end of the blade. The angle between the oppositely-directed teeth is presently preferred to be about 90 degrees. More teeth can be provided, and it is also possible to provide teeth on the rear side of the blade. The precise shape and size of the teeth can also be altered. It is presently preferred that the teeth 46 not extend beyond the adjacent side edge 50 of the blade 16. The teeth 46 also are preferably not offset from the plane of the blade. In this manner, the blade 16 will avoid snags and binding, yet will pulverize the brittle glass and break the tough, flexible plastic lamination, both during the upstroke and the downstroke.

A presently preferred blade is approximately 3-4 inches in length. The shank 44 is preferably about 0.5-1 inch in length, preferably about 0.8 inches. The section of the blade with teeth 46 is preferably about one-half inch in length. The relief of the teeth is preferably about 0.05-0.15 inch, most preferably about 0.12 inch, while the radius of the cutting face of the teeth is preferably about 0.5-1.0 inch, most preferably about 0.7 inches. The distance between the leading edge of the teeth and the end of the blade is preferably about 0.25-0.5 inch, most preferably about 0.4 inches.

The tip 54 of the blade preferably is pointed to facilitate the piercing of the glass and plastic lamination by the blade, particularly during the initial penetration of the windshield. This pointed tip can also be used as a center punch to break tempered side windows and back glass, which must sometimes be performed. The blade preferably tapers toward the tip from the rear side 56 opposite the teeth to the front side 50 bearing the teeth 46. A wedge surface 60 is thereby created which contacts binding portions of the windshield during the downstroke to drive the blade 16 forward. The portable power source is preferably a tank 24 of compressed gas. Alternatively, a portable compressor can be utilized. Also, the air brakes on some fire engines and emergency vehicles have a fitting permitting the use of this pressurized air to fill tires in an emergency. Such a fitting can be utilized to power the invention.

Figure 6:
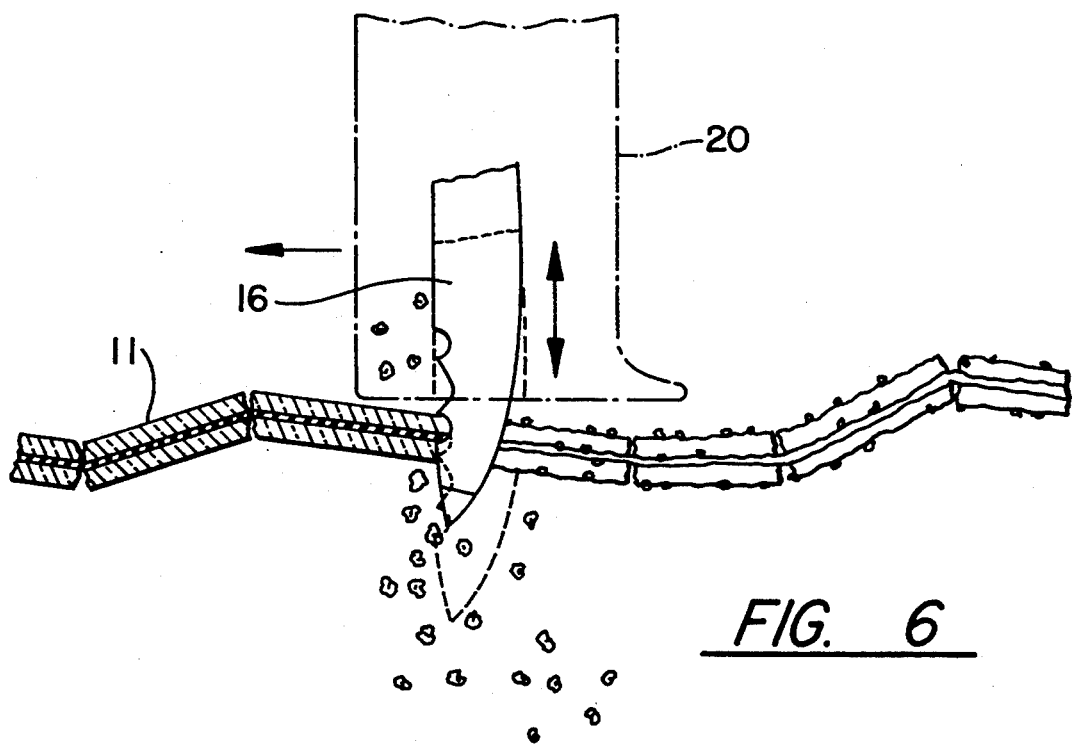
FIG. 6 is a side view, partially in cross-section and partially in phantom, illustrating the breaking and cutting of a laminated windshield by the method and apparatus of the invention.

The method of the invention is illustrated with reference to FIG. 1 and FIG. 6. The blade driver 20 and tank 24 or other portable power source are carried to the accident site. The tank 24 is set next to the vehicle 10. The tank can alternatively be strapped to the operator's back, and can be the same tank sometimes used to provide breathing air to the operator if a suitable branch connection is provided, such as that used for secondary breathing apparatus. The blade 16 is placed adjacent to the windshield 11, and the switch 30 operated to reciprocate the blade 16. The blade driver 20 is moved along the broken, uneven surface of the windshield to circumscribe all or a portion of the windshield that is to be removed. The windshield 11 can be quickly and more safely removed than is possible with prior techniques and apparatus, and with less effort on the part of the operator.

The invention is particularly suitable for cutting windshields which have been shattered and which wrinkle to form an irregular surface. Such surfaces cannot be cut by rotating wheel saws or other conventional kinds of cutting means. These surfaces also present significant danger to the operator because of the many irregular, sharp surfaces. The invention permits the operator to quickly and safely remove such damaged windshields.

The invention is capable of a number of modifications. It is possible that the blade driver could be an electric motor, with a portable power source such as a battery. Alternatively, improvements in technology may permit the incorporation of the battery or other power source into the blade driver, in the handle or in a contiguous attachment. It is alternatively possible that, in some instances, the power source could be located on an emergency rescue vehicle and a flexible cord or other connection would extend from that vehicle to the blade driver. The blade is also capable of modification, including the number, shape and dimension of teeth. The invention can be manufactured of any suitable material.

The invention is capable of other embodiments without departing from the spirit or essential attributes thereof, and accordingly, reference should be had to the following claims, rather than the foregoing specification, as indicated in the scope of the invention.

We claim:

1. An apparatus for removing laminated glass windows during emergency rescue operations, comprising:
   a blade for the breaking the laminated glass windows along a selected path;
   a pneumatic blade driver for reciprocating the blade; and,
   a tank of compressed gas, and a flexible hose connecting the tank to the blade driver, said tank being a breathing tank adapted to be strapped to the back of an operator.

2. A method for removing laminated glass windows from motor vehicles during emergency rescue operations, comprising the steps of transporting to the vicinity of the motor vehicle a blade, a blade driver operable with compressed gas to reciprocate the blade, and a portable source of compressed gas, selectively activating the blade driver, and moving the blade along a selected path to circumscribe a portion of the windshield that is to be removed.

3. The method of claim 2, wherein said method is applied to a laminated windshield.

* * * * *